April 23, 1929. G. EVENO Re. 17,283
LUBRICATING PADDLE FOR JOURNAL BOXES
Original Filed July 17, 1924
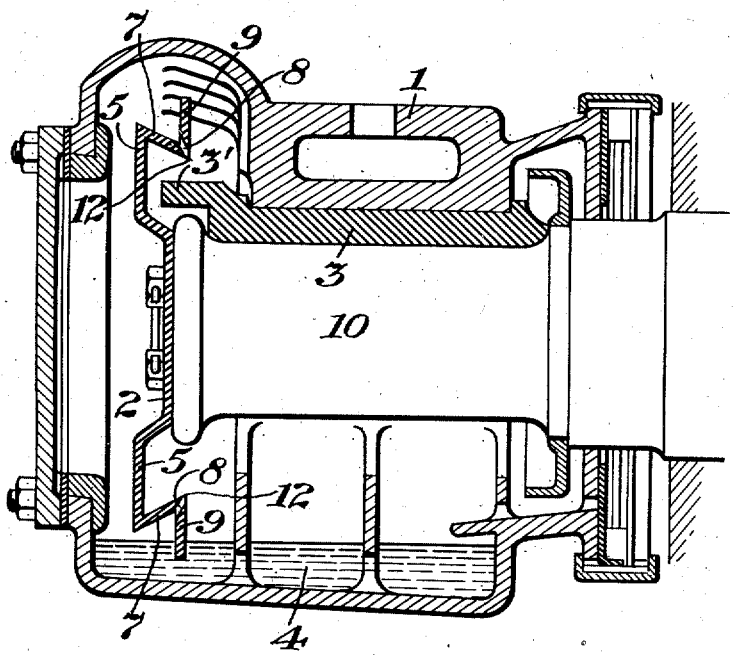
INVENTOR
BY Georges Eveno
HIS ATTORNEY Reissued Apr. 23, 1929. Re. 17,283

UNITED STATES PATENT OFFICE.

GEORGES EVENO, OF PARIS, FRANCE, ASSIGNOR TO ISOTHERMOS CORPORATION OF AMERICA, OF NEW YORK, N. Y., A CORPORATION OF DELAWARE.

LUBRICATING PADDLE FOR JOURNAL BOXES.

Original No. 1,617,205, dated February 8, 1927, Serial No. 726,633, filed July 17, 1924, and in France July 20, 1923. Application for reissue filed December 14, 1928. Serial No. 326,112.

The invention relates to lubricating devices for bearings, and more particularly to an oil distributing and elevating device or paddle used in connection with journal boxes of railway cars, whereby the oil is raised automatically during the travel of the vehicle and distributed to the bearing and journal arranged within the journal box.

Blades secured to the end of the axle have been heretofore used for this purpose, designed so as to have the oil adhere to the extremities of the blade while passing through the oil in the reservoir at the bottom of the box, and to distribute it over the top of the bearing while the extremity of the blade is traveling through the upper arc of its rotation. At low turning speed this is effected by the dripping of the oil directly from the blade upon the bearing, while at higher speeds, due to centrifugal force overcoming gravity, the oil is flung against the walls of the casing whence it reaches the bearing by flowing along the vertical walls towards said bearing.

In practice it has been found that, while this action is quite efficient at high and medium speeds, lubrication may become inadequate at low speeds. In that case only a small part of the oil taken up by the blade would reach the bearing while most of it would run along the blade back into the reservoir or would discharge in the form of a relatively broad sheet of oil from the bent portion of the blade, thus missing the front part of the bearing onto which the oil should be discharged.

The object of the present invention is to increase the efficiency of devices of this type by effecting the more complete and positively guided discharge of the oil from the device when operating at low speeds.

To this end, the invention comprises a special distributor or paddle, preferably in the form of a blade adapted to be secured to the end of the axle or journal at right angles to the axis of the latter, so that the end of the paddle dips into the oil in the reservoir in the bottom of the journal box and collects the oil on the surfaces of the paddle end, whence it is discharged onto the top of the journal bearing; the end of the paddle being formed with a laterally bent section preferably inclined sharply toward the axis of rotation and terminating in a flat section parallel with the body of the blade, the laterally bent and terminal sections forming an angle, preferably acute, the apex of which constitutes a sharp edge to facilitate the discharge of the oil at low speeds in drops or films from one face of the terminal section onto the bearing, the oil carried on the other or front face of the terminal section collecting in the pocket formed by the aforesaid angle from which it may reach the bearing either by flowing out over the trailing corner of the pocket, under the influence of its inertia, or by flowing through one or more openings provided in the angular bend and thus joining the oil running down from the other face.

The invention is illustrated in the accompanying drawing, in which the figure is a vertical longitudinal section of a journal box showing the associated journal end of the axle with the paddle or distributor applied to the latter.

Referring to the drawing, 1 indicates the journal box as a whole, which is provided at its bottom with an oil well or reservoir 4. Mounted in a suitable seat in the top portion of the box is a bearing 3 having an extension 3′ overhanging the end of the axle, which latter is provided with the usual journal 10 engaging the bearing 3. It will be understood that the bearing 3 has formed therein the usual oil distributing ducts and channels, which lead the lubricant to the engaging faces of the journal and the bearing.

Secured to the end of the axle for rotation therewith is the oil elevating device or paddle, which, as shown, is in the form of a metal blade 2 having offset sections or bends 5 to clear the end of the bearing 3, each end of the blade having a laterally and inwardly bent section 7 and a flat terminal section 9 parallel with the body of the blade, the junction of the sections 7 and 9 forming an acute angular bend, the apex of which constitutes a sharp edge 12 directed toward the axis of rotation of the axle and overhanging the end 3′ of the bearing when passing thereover. One or more perforations 8 are formed in each angular bend between the sections 7 and 9 to afford communication between the pocket and the sharp exterior edge of the bend.

The operation of the device, unlike that of similar devices heretofore employed, insures the delivery of practically all of the oil picked up by the paddle ends to the top of the bearing 3, either by centrifugal force, or gravity, or by both, depending upon the speed of rotation of the axle. When the speed is high, the flat ends 9 of the paddle pass through the oil in the reservoir 4 and pick up a film or coating of oil, which, when the end of the paddle passes through the upper arc of its rotation, is discharged by centrifugal force against the upper inner wall of the journal box and directed over said wall onto the top of the bearing 3. If the speed of rotation of the axle is insufficient to cause the oil to be thrown off of the ends of the paddle by centrifugal force, when each paddle end reaches the upper portion of its path of rotation, the force of gravity causes the oil to flow along the faces of the end section 9, the oil on the face next to the axle flowing freely down said face and being discharged from the sharp edge 12 of the angular bend onto the extension 3′ of the bearing; the oil on the opposite face of the end section 9 likewise flowing down said face by gravity and tending to collect in the angle or pocket formed by the sections 7 and 9. From this pocket the oil may reach the top of the bearing either by flowing through the opening or openings 8 and thus being discharged from the sharp edge 12 together with the oil coming from the face next to the bearing or flowing out of said pocket over its trailing corner, in which latter case inertia causes the oil to trail the blade in a well defined, relatively narrow stream or in the form of individual drops or beads, depending upon the viscosity of the oil and the speed rotation.

It will be understood that the particular shape of the blade or paddle in so far as the offsets or bends 5 are concerned forms no part of the present invention, but is a necessary expedient to permit the paddle in its rotation to clear the projecting end 3′ of the bearing. In the event that the bearing does not project beyond the end of the axle, the body portion of the paddle or blade may be made flat, provided, however, that the ends are each formed with the laterally bent section 7 and the terminal section 9 parallel with the body, so that the juncture of said sections forms a substantial pocket on the inside of the bends and a relatively sharp edge on the outer apex, and the pocket and the edge being preferably connected by one or more openings, whereby the oil collecting in the pocket will be discharged either through the openings or over the trailing corner of the pocket and thus insuring that under any condition of speed or viscosity of the oil the maximum possible portion of the oil adhering to the blade will reach the bearing.

What I claim is:

1. A lubricating device for journal boxes comprising a blade adapted to be secured to the end of the axle having at its end a laterally bent section and a terminal section, the juncture of said sections forming an oil-discharging edge movable in a path extending over the bearing, and an opening through the blade at said edge; whereby oil from both faces of said terminal section will be discharged at said edge onto the bearing.

2. A lubricating device for journal boxes comprising a blade adapted to be secured to the end of the axle having at its end a laterally and inwardly bent section and a terminal section, said sections forming an acute angled pocket and an external oil-discharging edge, the latter being movable in a path extending over the bearing, and an opening through the blade connecting the pocket and the edge; whereby oil from both faces of said terminal section will be discharged at said edge onto the bearing.

3. A lubricating device for journal boxes comprising a blade adapted to be secured to the end of the axle having at its end a laterally bent section and a terminal section parallel with the body of the blade, the juncture of said sections forming a sharp edge, and an opening through the blade at said edge; whereby oil from both faces of said terminal section will be discharged at said edge onto the bearing.

4. A lubricating device for journal boxes comprising a blade adapted to be secured to the end of the axle having at its end a laterally and inwardly bent section and a terminal section parallel with the body of the blade, said sections forming an acute angled pocket and a sharp external edge, and an opening through the blade connecting the pocket and the edge; whereby oil from both faces of said terminal section will be discharged at said edge onto the bearing.

5. A lubricating device for journal boxes comprising a blade adapted to be secured to the axle and having at its end a laterally and inwardly bent section and a terminal section, the latter section being adapted to dip into and move edgewise through the oil, said two sections forming an oil pocket for collecting oil from one face of the blade and movable in a path extending over the bearing, said oil pocket discharging oil from a corner thereof into the oil drip from an edge of the blade.

6. A lubricating device for journal boxes comprising a blade adapted to be secured to the axle and having at its end a laterally and inwardly bent section and a terminal section, said latter section being adapted to dip into and move edgewise through the oil, and said two sections forming an acute angled oil pocket for collecting oil from one face of the blade and movable in a path extending over the bearing and discharging the collected oil from a corner of the pocket into the oil drip from an edge of the blade.

7. A lubricating device for journal boxes comprising a blade adapted to be secured to the end of the axle having at each end a laterally bent section and a terminal section parallel with the body of the blade, the juncture of said sections forming a sharp edge, and an opening through the blade at said edge; whereby oil from both faces of said terminal section will be discharged at said edge onto the bearing.

8. A lubricating device for journal boxes comprising a blade adapted to be secured to the end of the axle having at each end a laterally and inwardly bent section and a terminal section parallel with the body of the blade, said sections forming an acute angled pocket and a sharp external edge, and an opening through the blade connecting the pocket and the edge; whereby oil from both faces of said terminal section will be discharged at said edge onto the bearing.

In witness whereof, I affix my signature.

GEORGES EVENO.